United States Patent [19]

McCombs

[11] Patent Number: 4,509,959
[45] Date of Patent: Apr. 9, 1985

[54] MODULAR INDUSTRIAL OXYGEN CONCENTRATOR

[75] Inventor: Norman R. McCombs, Tonawanda, N.Y.

[73] Assignee: Greene & Kellogg, Inc., Tonawanda, N.Y.

[21] Appl. No.: 517,896

[22] Filed: Jul. 28, 1983

[51] Int. Cl.³ .............................. B01D 53/04
[52] U.S. Cl. ...................... 55/161; 55/179; 55/387
[58] Field of Search ................ 55/160–163, 55/179, 180, 275, 387, 389

[56] References Cited

U.S. PATENT DOCUMENTS

| | | | |
|---|---|---|---|
| 2,625,237 | 1/1953 | Gribler et al. | 55/179 X |
| 2,703,628 | 3/1955 | Pompeo et al. | 55/161 |
| 3,016,978 | 1/1962 | Hull | 55/179 |
| 3,155,471 | 11/1964 | Schymik et al. | 55/179 X |
| 3,164,452 | 1/1965 | Westeren et al. | 55/179 X |
| 3,552,096 | 1/1971 | Dayson | 55/179 X |
| 4,127,395 | 11/1978 | McKey et al. | 55/179 X |
| 4,194,890 | 3/1980 | McCombs et al. | 55/179 X |
| 4,263,018 | 4/1981 | McCombs et al. | 55/179 X |
| 4,266,952 | 5/1981 | Turek | 55/179 |
| 4,272,265 | 6/1981 | Snyder | 55/179 X |
| 4,302,224 | 11/1981 | McCombs et al. | 55/179 X |
| 4,331,457 | 5/1982 | Morner | 55/179 X |
| 4,342,573 | 8/1982 | McCombs et al. | 55/179 X |
| 4,373,938 | 2/1983 | McCombs | 55/179 X |
| 4,378,982 | 4/1983 | McCombs | 55/179 X |

Primary Examiner—Robert Spitzer
Attorney, Agent, or Firm—Roylance, Abrams, Berdo & Goodman

[57] ABSTRACT

A modular pressure swing tonnage adsorption (PSA) apparatus for separating mixtures of gases into component parts comprises a plurality of pre-fabricated modules adapted for on-site assembly. The modular apparatus includes a first module including at least one gas adsorption apparatus for effecting the gas separation, a second module including a surge tank for collecting one component gas separated out of the gas mixture by the first module, a third module including apparatus for delivering the gas mixture to the first module and for conducting waste gas away from the first module, a fourth module including apparatus for transfering the one component gas away from the first module to the second module, and for directing gas to the first module for purging the first module, and apparatus for pneumatically and electrically, mechanically interconnecting the first, second, third and fourth apparatus, so that the modules may be delivered as individual modules to a site for PSA use, and assembled on-site by mechanically, pneumatically and electrically interconnecting the components, to thereby produce a relatively large such unit adapted to produce relatively large quantities of the one component of gas.

22 Claims, 3 Drawing Figures

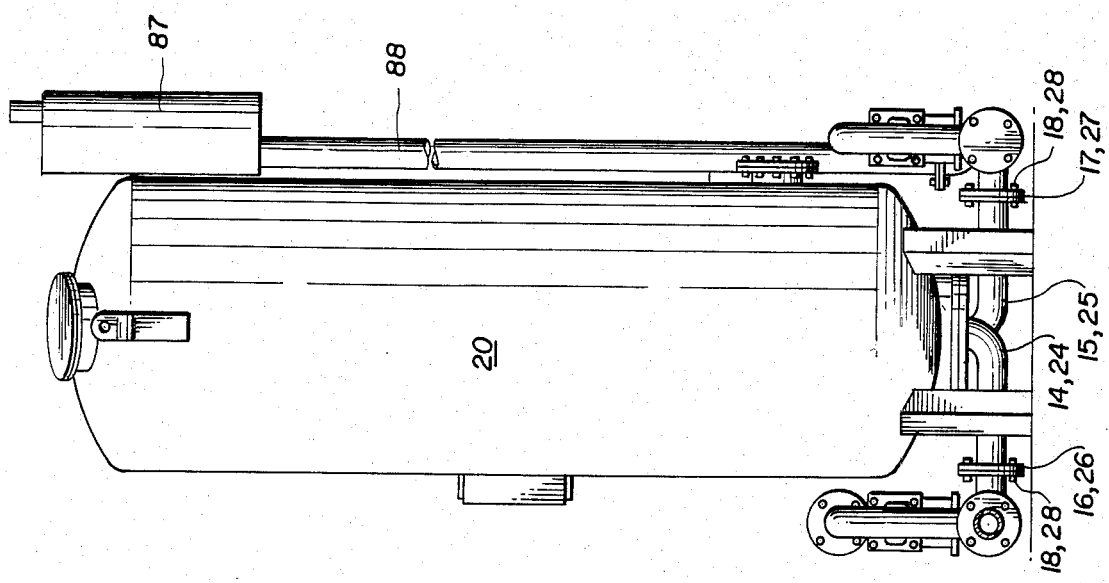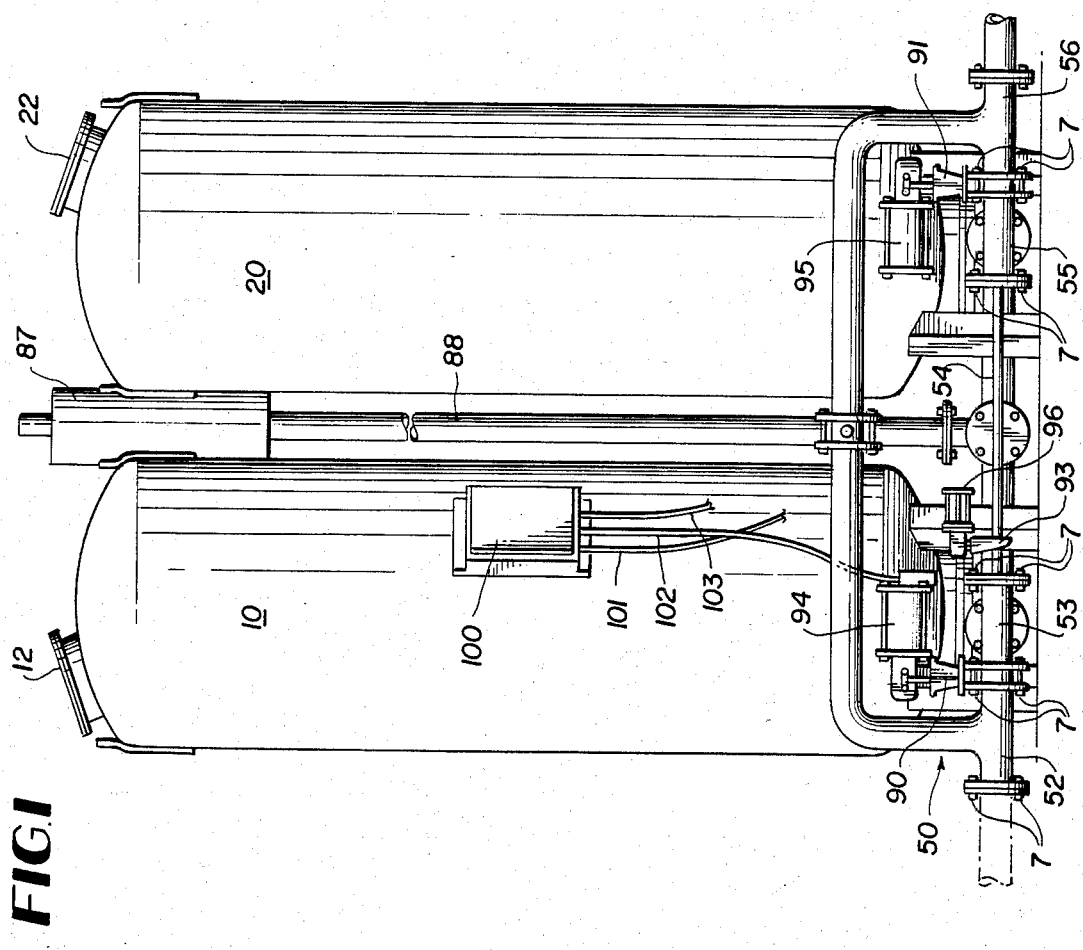

MODULAR INDUSTRIAL OXYGEN CONCENTRATOR

BACKGROUND OF THE INVENTION

This invention relates to apparatus for the separation of mixtures of gases into component parts. More particularly, the invention relates to relatively large scale industrial machinery made of modular components used to employ pressure swing adsorption (PSA) processes to perform such gas separations.

Pressure swing adsorption is well known in the prior art, as exemplified by the inventor's prior U.S. Pat. Nos. 4,263,018 and 4,194,890 which disclose a particular pressure swing adsorption technique. Very briefly, pressure swing adsorption may involve, for example, delivery of air at relatively high pressure to one of two beds of adsorbent material, with one bed being utilized to produce that gas in the mixture which passes through the bed most rapidly, and the second bed being back flushed with a side stream of the product from the first bed. When the first bed is about saturated with the slower moving gas component, the cycle is reversed and the second bed goes on "production" while the first bed goes on "regeneration". The present invention is usable with many such systems and techniques which are known in the art, or which may be invented in the future. Relatively small scale modular apparatus for carrying out pressure swing adsorption processes is exemplified by the inventor's prior U.S. Pat. No. 4,373,938.

The present invention is concerned with equipment of modular construction used to perform such pressure swing adsorption processes in heavy industrial applications. Since such industrial applications produce very large quantities of product gas (oxygen or nitrogen), such applications are often referred to herein by the word "tonnage". While PSA equipment in industrial usage is common in the prior art, modular PSA tonnage units have heretofore not been known. Modular construction of PSA tonnage units have many advantages over the art presently known; PSA tonnage units according to the invention are much more easily fabricated on site, more easily shipped, more easily assembled, and easier to install. This is also accompanied by a reduction of cost and materials required in manufacture and for fabrication.

The present invention is not concerned with any particular pressure swing adsorption (PSA) cycle per se. The invention can be used with virtually any cycle, and has the capacity to operate in different multi-bed or single bed cycles, with suitable modifications to the controls which determine the cycle; and to the interconnections between the valves, and/or changes to the vessels in the bed vessel module if needed.

Standard components, for example composite pilot-cylinder-wafers, or globe type valve arrangements, may be used without significant modification to the existing equipment. Use of such "off-the-shelf" parts is an important advantage of this invention.

The modular tonnage unit of the present invention is made up of four basic modules; (1) the adsorber units, (2) the feed/waste manifold, (3) the purge/product manifold, and (4) the surge tank.

The present invention has numerous advantages over the equipment or apparatus of the prior art. For example, the surge tank of the invention tonnage unit can be of varying size depending upon the particular conditions of the environment in which the invention is used. Improved means for deadening sound normally associated with the pressure swing adsorption (PSA) process, provided by the present invention, may include little more than a standard automotive muffler. The present invention further permits the feed/waste manifold and the purge/product manifold to be double-ended, the end not being used being easily closed off by a plate on site. This feature enables the user to plumb the apparatus in whatever way and to which ever side is most convenient for him in his particular environment of use.

Another aspect of the improvement which the present invention provides is that it facilitates transportation of the tonnage unit because the two vessels used for the adsorbers are separate from each other and are joined only on-site when the manifolds are put in place.

Yet another advantage of the present invention, where necessary, is that even though it is required to use compressed gas in PSA, the invention can be made with or without its own compressor, so that customers may use compressors, or central sources of compressed gas. Thus a compressor, per se, is not always provided with the invention.

Still another advantage of the present invention is that the modular manifolds facilitate use of the same adsorber beds, compressor and surge tank with different manifolds. Thus, it is possible to match the particular embodiment of the invention required and constructed to the precise demands of the customer or environment in which it is to be used.

Yet another advantage of the present invention is that the electrical circuitry required to make the tonnage unit operable is prefabricated (modular). Thus, after the mechanical fabrication is completed, on-site assembly of the electrical portion is made extremely simple. Basically, a power line is run out to the control box, and a line from the control box is run out to the controls (valves, etc.) of each manifold.

Finally, the reduction of manufacturing cost is substantial and is attributed to the modular approach of construction used in the present invention. The entire machine is reduced to a plurality of individual modules, each of which can be separately fabricated to thus greatly simplify overall construction. The final fabrication of the present invention therefore comprises only the assembly of the prefabricated modules on site. These modules are mounted and otherwise assembled with simple electrical, mechanical and pneumatic connections, and the construction of the overall machine is quickly completed.

Thus, the objects of the invention include the provision of apparatus of the character described above useful in on-site heavy industrial applications, and which will permit a modular approach to assembly, repair and use of the invention in such an environment. The invention provides a machine of the character described which achieves the above advantages and which provides highly reliable, relatively low cost and efficient machines to meet the goals of the invention.

BRIEF DESCRIPTION OF THE DRAWINGS

The above and other advantages of the invention will be pointed out or will become evident in the following detailed description and claims, and in the accompanying drawings forming a part of this disclosure, in which;

FIG. 1 is a front elevational view of the assembled pressure swing adsorption (PSA) apparatus;

FIG. 2 is a side elevational view of the assembled pressure swing adsorption (PSA) apparatus looking from the right side of FIG. 1.

DETAILED DESCRIPTION OF THE INVENTION

Figure 3:
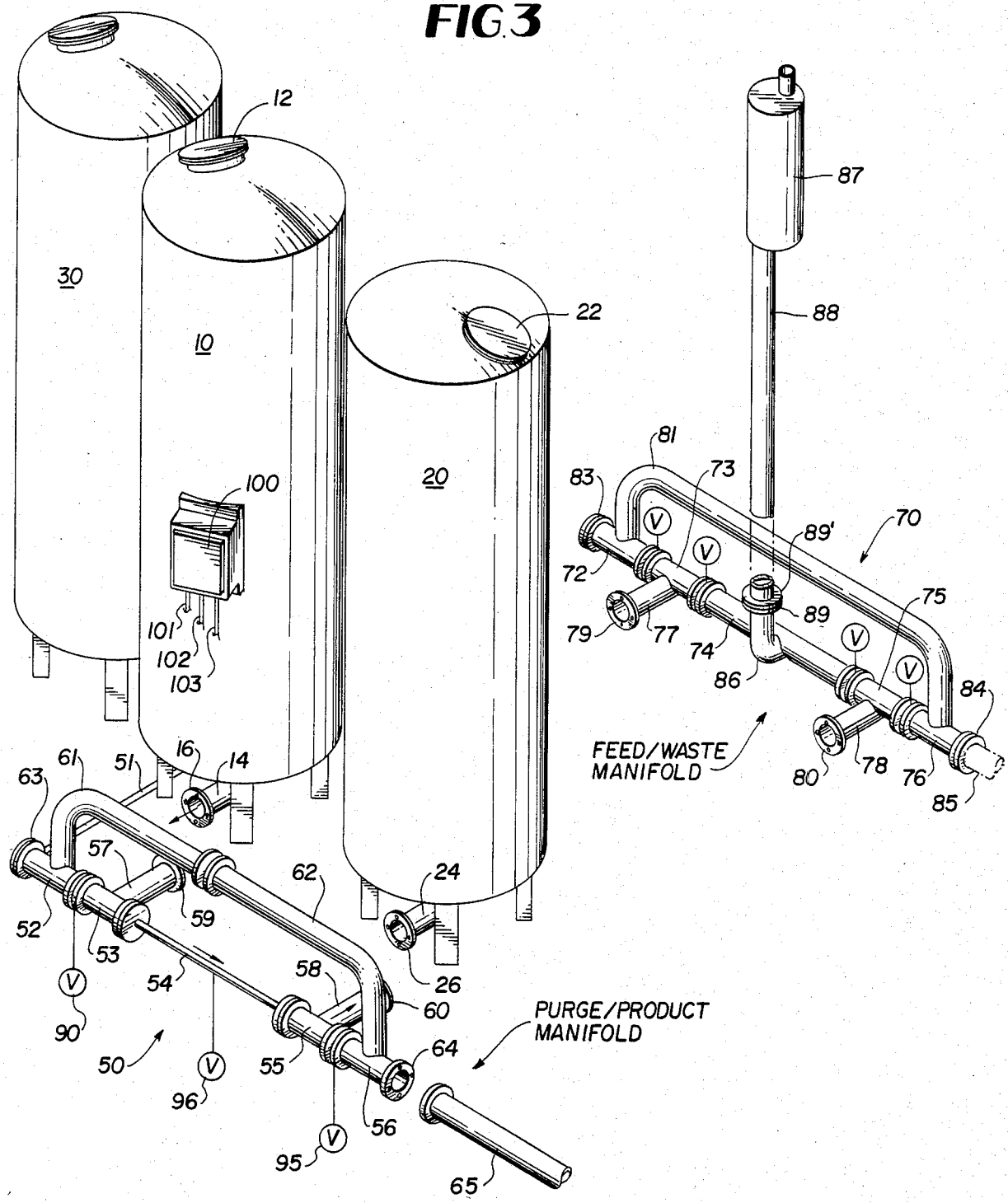
FIG. 3 is an exploded view showing the manner in which the modular components may be interconnected, with some parts omitted for the sake of clarity.

Referring now to the drawings, there is shown the pressure swing adsorption (PSA) apparatus of the present invention.

The apparatus includes modularized adsorber tanks 10, 20 disposed in upstanding, side-by-side relationship, a surge tank 30 located proximate the adsorber tanks and an electrical circuitry control module 100. Front and rear (left and right as seen in FIG. 3) modular manifold assemblies 50 and 70, respectively interconnect the adsorber tanks with the surge tanks. Surge tank 30 is normally connected by a pipe, shown generally at 51, to the assembly of purge/product manifold module 50. The surge tank need not be positioned in the immediate vicinity of the adsorber tanks; however, it is desirable for convenience and economy of space. Thus, with the modular construction of the present invention, the apparatus is more easily assembled and installed on-site, and alternatively more easily disassembled, and shipped.

Each of the adsorber tanks 10, 20 includes a fill port 12, 22, respectively positioned preferably at the upper end of the tank so that adsorbent molecular sieve material, commonly employed in the pressure swing adsorption (PSA) process, may be introduced into the respective tank. After each tank has been filled to a desired level, the port is sealed by a plug or plate in the conventional manner.

Connected to the bottommost portion of adsorber tank 10 are a pair of pipes 14, 15. The end of each of these pipes terminates in a flange 16, 17, respectively, formed with a plurality of through-holes for the receipt of fastening bolts. As shown in FIG. 2, the one pipe 14 extends forwardly toward the purge/product manifold modular assembly 50 while the other pipe 15 extends rearwardly toward the feed/waste manifold modular assembly 70.

In a similar manner, adsorber tank 20 includes a pair of pipes 24, 25 connected preferably at, and to, the bottommost portion of the tank, with pipe 24 extending forwardly toward the purge/product manifold modular assembly 50 and pipe 25 extending rearwardly toward the feed/waste manifold module 70. The ends of these pipes 24, 25 each terminate in a flange 26, 27 respectively, with each flange being formed with a plurality of through-holes for the receipt of fastening bolts 18, 28, respectively.

The purge/product manifold module 50, positioned in front of the adsorber tanks 10, 20, is pre-fabricated of pipe segments 52,53,54,55,56, which terminate on opposite ends at flanges 63 and 64. The pipes 52-56 are coaxially arranged and are bolted end-to-end with fastening bolts 7 as seen in FIG. 1. Pipes 52, 53 and 55, 56 are of the same internal diameter, while pipe 54 has a smaller internal diameter, so that some product gas can be used to purge the other tank(s). Pipes 53 and 55 include extensions 57 and 58 therefrom for connection with pipes 14 and 24, with the interiors of the extensions being in fluid communication with the interiors of pipes 53 and 55 respectively. Extensions 57 and 58 each are connectable with the pipes 14, 24 and through flanges 59, 60 respectfully, carried on the free ends of the extensions. Flanges 59, 60 are each formed with a plurality of through-holes for receiving the fastening bolts carried by flanges 16, 26 of pipes 14, 24. Thus, the sole connection of module 50 to the adsorber beds 10 and 20 is done easily, on site, by connection of flanges 26 and 60 and 16 and 59.

Extending between, and interconnecting, pipe 52 and 56 is a cross-over pipe or conduit shown in FIG. 3 as including two halves 61, 62 of substantially similar configuration bolted together at flanged ends at a point between pipes 52 and 56. Cross-over pipes 61, 62 are located above, and substantially overlie, pipes 52-56, and may alternatively comprise a single length of tubing having the same configuration. One of the flanges 63, 64, provided on the free ends of pipes 52, 56, respectively, is closed with a cap or cover plate (not shown) bolted thereto, while the other of the flanges is connected to a product delivery pipe, shown for example in FIG. 3 at 65. Thus, connection of the product delivery pipe 65 to pipe 56 and closure of valves 90 and 95 enables flow of the gas component produced and stored in surge tank 30 into pipe 56 of the purge/product manifold module, through cross-over pipes 61, 62 and via pipe 56 to delivery pipe 65. The feed/waste manifold module 70, positioned behind adsorber tanks 10, 20 similarly includes pipes 72,73,74, 75, 76 each terminating on opposite ends in flanges, and each being of similar diameter. The pipes 72-76 are coaxially arranged and are bolted end-to-end with fastening bolts (not shown) in a manner similar to that described above in connection with pipes 52-56 of the purge/product module 50. Extensions 77 and 78 extend forwardly from, and are in fluid communication with pipes 73 and 75 respectively. Extensions 77 and 78 are each connectable with the pipes 15, 25 through flanges 79, 80 respectively, carried on the free ends of the extensions, the flanges each being formed with bolt holes for receiving the fastening bolts carried by flanges 17, 27 of pipes 15, 25. Extending between, and interconnecting, pipe 72 and 76 is a cross-over pipe or conduit 81 located above, and substantially overlying pipes 72-76. One of the flanges 83,84, provided on the free ends of pipes 72, 76 respectively, is closed with a cap or cover plate (not shown) bolted thereto, while the other of the flanges is connected to a fluid feed pipe (shown at 85 in FIG. 3), whereby gas to be separated is fed to the PSA apparatus of the present invention. Extending forwardly from pipe 74, preferably centrally thereof, is an exhaust pipe 86 through which nitrogen is exhausted when one of the adsorber tanks 10, 20 is being purged. Connected to exhaust pipe 86 is exhaust muffler 87 suitably supported in an upright substantially vertical orientation rearwardly of adsorber tanks 10, 20. Muffler 87 includes an extender pipe 88 interconnecting muffler 87 with pipe 86, the connection being made between flanges 89, 89' terminating respective ends of exhaust pipe 86 and extender pipe 88. Exhaust muffler 87 may be any type of conventional muffler normally used to deaden sound in the purge cycle of operation of the PSA equipment, including a standard automotive muffler. Use of such a component, a standard muffler, is an important advantage for the invention.

Associated with the purge/product manifold 50 are electrically actuated solenoid valves 90, 91 and 93, mounted between adjacent flanges of pipes 52 and 53, between adjacent flanges of pipes 55 and 56 and in the restricted diameter pipe 54, respectively. Valves of this kind typically include a flow blocking element which is movable between an "open" position wherein flow of fluid is permitted, and a "closed" position wherein flow of fluid is blocked. Electrical actuation of the valve causes the blocking element to move from its normal "open" position to a "closed" position. The valves 90, 91 can be arranged so that when the blocking element of valve 90 is in its "open" position, the blocking element of valve 91 is in its "closed" position and actuation of valves 90, 91 is effected by solenoids 94, 95. Valve 93 is actuatable by by solenoid 96 for blocking flow through pipe 54 when demanded by the particular PSA cycle in use.

Similarly, feed/waste manifold module 70 includes pairs of electrically-actuated valves all marked by "v" in a circle (similar to valves 90, 91 described above) positioned on opposite sides of pipes 73 and 75. Associated with each of the valves or valve pairs is a solenoid for actuating the valve or valve pairs.

As shown most clearly in FIG. 1, an electrical circuit control box 100 is mounted on one of the adsorber tanks (tank 10 for purposes of illustration). The control circuitry is state-of-the-art and does not form part of the present invention. However, the invention does encompass the ease of connection of the PSA equipment modules described above to the control box circuitry, and to this end, the control box is provided with only three wires 101,102,103, one of which is the main powerline, and each of the others being control lines running to the controls of each of the two manifold assemblies, respectively.

On-site mechanical fabrication is made extremely easy by the modular PSA components of the present invention, and involves merely a few steps; positioning surge tank 30 and the two adsorber tanks preferably in proximity to one another; bolting flanges 59,60 of extensions 57,58 carried by the purge/product manifold tubing assembly 50 to the flanges 16, 26 of the pipes 14, 24 carried by adsorber tanks 10, 12 respectively; bolting the flanges 79, 80 of extensions 77, 78 carried by the feed/waste manifold tubing assembly 70 to the flanges 17, 27 of the pipes 15, 25 carried by absorber tanks 10, 12, respectively; and securing pipe 51 from manifold tubing assembly 50 to surge tank 30.

After the mechanical fabrication has been completed, the assembled components are made operational simply by connecting the main power line of control box 100 to a suitable power source, and each of the other lines to appropriate connections carried by the purge/product, and the feed/waste, manifold modules 50 and 70. No further electrical connections are needed.

As is well-known to those skilled in these arts, the valves described above are employed to control, via the control circuitry built into the control box 100, (as with a cam timer or the like) all the various gas flows including flow of feed gas into the apparatus, as for example via pipe 85; flow of product gas out of the apparatus produced during a production cycle of one of the adsorber tanks, as for example via pipe 65; flow of waste gas out of the apparatus during a purge or regeneration cycle of the other of the adsorber tanks via muffler 87, etc.

While the invention has been described in detail above, it is to be understood that this detailed description is by way of example only. The present invention further encompasses PSA apparatus employing any number "n" of adsorber tanks or beds. The beds are preferably separate from one another ($n \geq 1$), and the invention contemplates the use of various beds with different manifold modules and/or controls to thus perform different cycles. Thus the protection granted is to be limited only within the spirit of the invention and the scope of the following claims.

Further, while discussed herein as separating oxygen out of air, oxygen being the desired gas; the invention can also be used to separate nitrogen out of air, or virtually any gas out of virtually any mixture of gases. In such case, different adsorbent materials and various PSA cycle changes would be presumed as needed.

It will be obvious to those skilled in the art that various changes may be made without departing from the scope of the invention and the invention is not to be considered limited to what is shown in the drawings and described in the specification.

What is claimed is:

1. A modular pressure swing tonnage absorption apparatus for separating mixtures of gases into component parts, said apparatus being made substantially entirely of a plurality of pre-fabricated modules comprising;
    a first module including at least one gas absorption means for effecting the gas separation;
    a second module including a surge tank for collecting one component gas separated out of said gas mixture by said first module;
    a third module including means for delivering the gas mixture to said first module and for conducting waste gas away from said first module;
    a fourth module including means for transferring said one component gas away from said first module to said second module, and for directing gas to said first module for purging said first module;
    electrically operated control means associated with at least one of said first through fourth modules;
    means for pneumatically, electrically and mechanically interconnecting said first, second, third and fourth modules and said electrically operated control means, whereby said apparatus may be moved as individual modules to or from a site for PSA use, and assembled on-site by mechanically, pneumatically and electrically interconnecting said components, to thereby produce a relatively large such unit adapted to produce relatively large quantities said one component gas;
    said means mechanically interconnecting said modules comprising flange means, and
    said first, second, third and fourth modules being of dimensions sufficient to handle large enough quantities of said mixtures of gases to produce said large quantities of said one component of said gas on the order of tons per day of said one component gas.

2. The apparatus of claim 1, wherein said third module comprises a pre-assembled feed/waste gas manifold assembly comprising first pipe means, second pipe means coupled to and selectively communicating with portions of said first pipe means, and first valve means for selectively coupling portions of said first pipe means with said second pipe means.

3. The apparatus of claim 2 wherein said first module comprises first and second gas adsorption means and said first pipe means includes a first portion defining said delivering means and a second portion defining said conducting means, said second pipe means being coupled to said first and second portions, said first portion including said means for mechanically interconnecting said first gas adsorption means with said third module, and said second portion including said means for mechanically interconnecting said second gas adsorption means with said third module.

4. The apparatus of claim 3 wherein each of said first and second gas adsorption means includes conduits extending externally and communicating with the interior thereof, said first portion including a pipe section extending therefrom toward said first gas adsorption means and said second portion including a pipe section extending therefrom toward said second gas adsorption means, and said mechanically interconnecting means being carried by said first and second portion pipe sections and said conduits.

5. The apparatus of claim 4 wherein said second pipe means is coupled to said first and second portions on opposing sides of said first and second portion pipe sections, respectively, said valve means being operatively disposed between opposing ends of said second pipe means and comprising said means for pneumatically interconnecting said first and third modules.

6. The apparatus of claim 5 wherein said first valve means comprise first and second pairs of valves, said first valve pair being operatively disposed on opposing sides of said first portion pipe section and said second valve pair being operatively disposed on opposing sides of said portion pipe section.

7. The apparatus of claim 5 wherein said first pipe means includes a third portion disposed between and communicating with, said first and second portions, said third module conducting means being supported on, and communicating with, said third portion.

8. The apparatus of claim 1, wherein said fourth module comprises a pre-assembled purge/product gas manifold assembly comprising third pipe means, fourth pipe means coupled to, and selectively communicating with portions of said third pipe means, and second valve means for selectively coupling portions of said third pipe means with said fourth pipe means.

9. The apparatus of claim 8 wherein said first module comprises first and second gas adsorption means, and said third pipe means includes a first portion defining said transferring means and a second portion defining said directing means, said fourth pipe means being coupled to said first and second portions, said first portion including said means for mechanically interconnecting said first gas adsorption means with said fourth module, and said second portion including said means for mechanically interconnecting said second gas adsorption means with said fourth module.

10. The apparatus of claim 9, wherein each of said first and second gas adsorption means includes conduits extending externally and communicating with the interior thereof, said first portion including a pipe section extending therefrom toward said first gas adsorption means and said second portion including a pipe section extending therefrom toward said second gas adsorption means, said mechanically interconnecting means being carried by said first and second pipe sections and said conduits.

11. The apparatus of claim 10, wherein said fourth pipe means is coupled to said first and second portions on opposing sides of said first and second pipe sections, respectively, said valve means being operatively disposed between opposing ends of said second pipe means and comprising said means for pneumatically interconnecting said first and fourth modules.

12. The apparatus of claim 11, wherein said second valve means comprises first and second pairs of valves, said first valve pair being operatively disposed on opposing sides of said first pipe section and said second valve pair being operatively disposed on opposing sides of said second portion pipe section.

13. The apparatus of claim 12, wherein said third pipe means includes a third portion disposed between, and communicating with, said first and second porrtions, and said fourth module directing means including said third portion.

14. The apparatus of claim 13, wherein said third portion defines means for controlling flow of gas from said first gas adsorption means to said second gas adsorption means.

15. The apparatus of claim 14, wherein said controlling means comprises a pipe section of cross-sectional area less than the cross-sectional area of first and second portions.

16. The apparatus of claim 15, wherein said controlling means further comprises third valve means operatively disposed in said third section.

17. The apparatus of claim 14, wherein said controlling means comprises third valve means operatively disposed in said third section.

18. The apparatus of claim 1, wherein said at least one gas adsorption means includes conduits extending externally and communicating with the interior, thereof, said means for mechanically interconnecting said first, third and fourth modules comprising pipes means in said first, third and fourth modules and said conduits.

19. The apparatus of claim 18 wherein said means for pneumatically interconnecting said first, third and fourth modules comprises said first and second valve means and said pipes means.

20. The apparatus of claim 1, wherein said third module includes means for suppressing noise generated by said waste gas.

21. The apparatus of claim 20, wherein said noise suppressing means comprises a standard automotive muffler.

22. A relatively large capacity PSA machine adapted to be built up on-site of a plurality of preassembled modules, said modules comprising a gas absorption means module comprising at least one pressure vessel, a feed/waste gas manifold and valve assembly module, a purge/product gas manifold and valve assembly module, and a surge tank means module, electrically operated control means for the valves in said feed/waste and said purge/product manifold modules, means to permit relatively fast and simple on-site mechanical, pneumatic and electrical assembly of said modules and control means into said PSA machine; said means to permit assembly comprising flange means interconnecting the gas handling portions of said at least one pressure vessel, said feed/waste gas module, said purge/product gas module, and said surge tank means module; and said capacity of said machine being on the order of tons per day of product gas.

* * * * *